US007118100B2

(12) United States Patent
Tewani et al.

(10) Patent No.: US 7,118,100 B2
(45) Date of Patent: Oct. 10, 2006

(54) MAGNETORHEOLOGICAL-FLUID HYDRAULIC MOUNT

(75) Inventors: Sanjiv G. Tewani, Lebanon, OH (US); Mark O. Bodie, Dayton, OH (US); Jamieson K. Kiefer, Middletown, OH (US); Mark W. Long, Bellbrook, OH (US); John A. Walterbusch, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/825,731

(22) Filed: Apr. 16, 2004

(65) Prior Publication Data
US 2005/0230890 A1    Oct. 20, 2005

(51) Int. Cl.
*F16F 5/00*    (2006.01)
*F16F 9/53*    (2006.01)

(52) U.S. Cl. .............................. 267/140.15; 188/267.2; 267/140.14

(58) Field of Classification Search ............. 188/267.1, 188/267.2, 267; 267/140.13, 140.14, 140.15
See application file for complete search history.

(56) References Cited

U.S. PATENT DOCUMENTS

| | | | | |
|---|---|---|---|---|
| 4,679,779 A | * | 7/1987 | Hodonsky | 267/140.13 |
| 4,720,087 A | * | 1/1988 | Duclos et al. | 267/140.14 |
| 4,973,031 A | * | 11/1990 | Takano et al. | 267/140.14 |
| 4,981,286 A | * | 1/1991 | Kato et al. | 267/140.14 |
| 5,246,211 A | * | 9/1993 | Klein et al. | 267/140.13 |
| 5,273,262 A | | 12/1993 | Baldini et al. | 267/140.13 |
| 5,730,429 A | * | 3/1998 | Ivers et al. | 267/140.14 |
| 6,412,761 B1 | | 7/2002 | Baudendistel et al. | 267/140.14 |
| 6,622,995 B1 | | 9/2003 | Baudendistel et al. | 267/140.14 |
| 6,749,045 B1 | * | 6/2004 | Rosenfeldt et al. | 188/267.1 |
| 2002/0171186 A1 | | 11/2002 | Baudendistel et al. | 267/140.15 |

FOREIGN PATENT DOCUMENTS

| | | |
|---|---|---|
| EP | 1 288 526 | 3/2003 |
| JP | 03 229032 | 10/1991 |
| WO | WO-0151826 A1 * | 7/2001 |

* cited by examiner

*Primary Examiner*—Melody M. Burch
(74) *Attorney, Agent, or Firm*—Jimmy L. Funke

(57) ABSTRACT

A magnetorheological-fluid hydraulic mount includes a hydraulic-mount partition plate assembly, a hydraulic-mount decoupler, an electric coil, and a flexible membrane assembly. The partition plate assembly has first and second sides, has a non-magnetorheological-fluid first orifice, and has a magnetorheological-fluid second orifice. The first orifice has a first terminus positioned at the first side and a second terminus positioned at the second side. The second orifice has a first end positioned at the first side and has a second end positioned at the second side. The hydraulic-mount decoupler is operatively connected to the first orifice. The electric coil is disposed to magnetically influence the second orifice. The flexible membrane assembly has a first membrane portion fluidly-isolating, on the first side of the partition plate assembly, the first end from the first terminus and has a second membrane portion fluidly-isolating, on the second side of the partition plate assembly, the second end from the second terminus.

20 Claims, 1 Drawing Sheet

MAGNETORHEOLOGICAL-FLUID HYDRAULIC MOUNT

TECHNICAL FIELD

The present invention relates generally to hydraulic mounts, and more particularly to a magnetorheological-fluid hydraulic mount.

BACKGROUND OF THE INVENTION

Conventional magnetorheological-fluid hydraulic mounts include those which are attachable to first and second motor-vehicle components (such as an automobile engine or transmission and an automobile frame) and which have a pumping chamber and a reservoir chamber. The pumping and reservoir chambers are separated by a partition plate having a first through hole containing a decoupler and having a second through hole not containing a decoupler. These mounts also have an electric coil which magnetically influences the second through hole but not the first through hole. Magnetorheological fluid is placed in the pumping and reservoir chambers and in the first and second through holes. The decoupler flexes for relative vibratory motion between the two motor-vehicle components which is of relatively low displacement. The decoupler bottoms out (i.e., reaches its fully flexed limit and flexes no further) for relative motion between the two motor-vehicle components which is of relatively high displacement. Examples of hydraulic-mount decouplers are found in U.S. Pat. Nos. 5,273,262 and 6,622,995.

What is needed is an improved magnetorheological-fluid hydraulic mount.

SUMMARY OF THE INVENTION

In a first expression of an embodiment of the invention, a magnetorheological-fluid hydraulic mount includes a hydraulic-mount partition plate assembly, a hydraulic-mount decoupler, an electric coil, and a flexible membrane assembly. The partition plate assembly has first and second sides, has a non-magnetorheological-fluid first orifice, and has a magnetorheological-fluid second orifice. The first orifice has a first terminus positioned at the first side and a second terminus positioned at the second side. The second orifice has a first end positioned at the first side and has a second end positioned at the second side. The hydraulic-mount decoupler is operatively connected to the first orifice. The electric coil is disposed to magnetically influence the second orifice. The flexible membrane assembly has a first membrane portion fluidly-isolating, on the first side of the partition plate assembly, the first end from the first terminus and has a second membrane portion fluidly-isolating, on the second side of the partition plate assembly, the second end from the second terminus.

In a second expression of an embodiment of the invention, a magnetorheological-fluid hydraulic mount includes a motor-vehicle hydraulic-mount partition plate assembly, a hydraulic-mount decoupler, an electric coil, a flexible membrane assembly, and a magnetorheological fluid. The partition plate assembly has first and second sides, has a non-magnetorheological-fluid first orifice, and has a magnetorheological-fluid second orifice. The first orifice has a first terminus positioned at the first side and a second terminus positioned at the second side. The second orifice has a first end positioned at the first side and has a second end positioned at the second side. The hydraulic-mount decoupler is operatively connected to the first orifice. The electric coil is disposed to magnetically influence the second orifice. The flexible membrane assembly has a first membrane portion surrounding, on the first side of the partition plate assembly, the first end and at least partially defining a magnetorheological-fluid pumping chamber. The flexible membrane assembly has a second membrane portion surrounding, on the second side of the partition plate assembly, the second end and at least partially defining a magnetorheological-fluid reservoir chamber. The magnetorheological fluid is placed in the magnetorheological-fluid pumping and reservoir chambers.

Several benefits and advantages are derived from one or more of the expressions of an embodiment of the invention. Having a decoupler operatively connected to a non-magnetorheological-fluid first orifice in the partition plate assembly allows, in one example, the decoupler to undergo flexing to isolate low displacement vibrations. Since, in this example, the non-magnetorheological fluid has a lower density than the magnetorheological fluid, the decoupler is operated by a lower-density fluid which improves high frequency performance of the mount. High frequency performance is also improved, in this example, by having air on the other side of the decoupler. Having a magnetorheological-fluid second orifice in the partition plate assembly allows the electric coil to control the viscosity of a magnetorheological fluid passing through the second orifice to control the vibration damping of the mount for high displacement vibrations when the decoupler is bottomed out. Applicants' design has, in one example, replaced some of the relatively expensive and heavier magnetorheological fluid with relatively inexpensive and lighter non-magnetorheological fluid resulting in a lower-cost and lower-weight magnetorheological-fluid hydraulic mount.

DESCRIPTION OF THE PREFERRED EMBODIMENT

Figure 1:
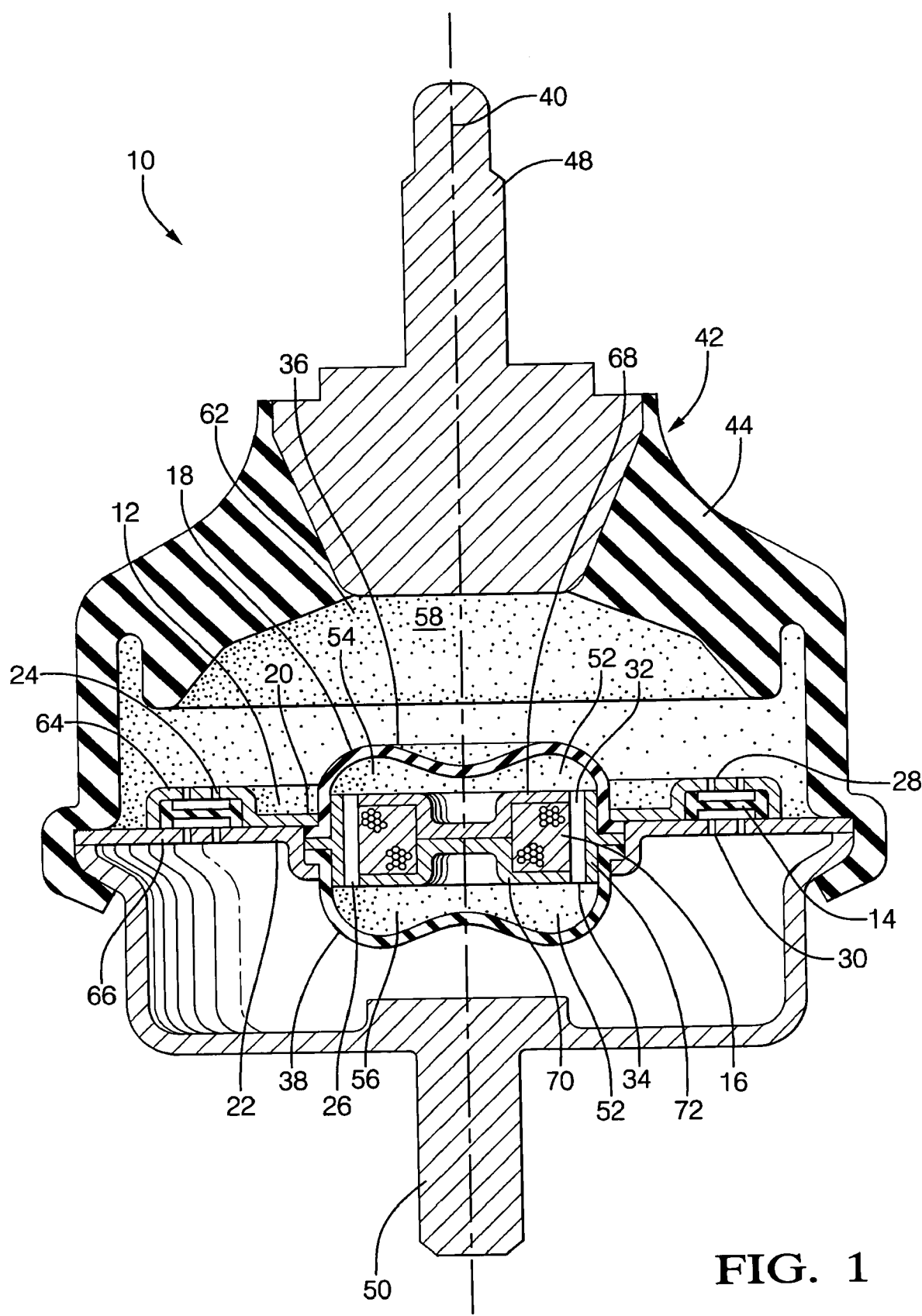
FIG. 1 is a longitudinal cross-sectional schematic view of an embodiment of a magnetorheological-fluid hydraulic mount of the invention.

Referring now to the drawing, FIG. 1 shows an embodiment of the present invention. A first expression of the embodiment of FIG. 1 is for a magnetorheological-fluid hydraulic mount 10 including a hydraulic-mount partition plate assembly 12, a hydraulic-mount decoupler 14, an electric coil 16, and a flexible membrane assembly 18. The partition plate assembly 12 has first and second sides 20 and 22, has a non-magnetorheological-fluid first orifice 24 and a magnetorheological-fluid second orifice 26, The first orifice 24 has a first terminus 28 disposed at the first side 20 and a second terminus 30 disposed at the second side 22. The second orifice 26 has a first end 32 disposed at the first side 20 and has a second end 34 disposed at the second side 22. The decoupler 14 is operatively connected to the first orifice 24. The electric coil 16 is disposed to magnetically influence the second orifice 26. The flexible membrane assembly 18 has a first membrane portion 36 fluidly-isolating, on the first side 20 of the partition plate assembly 12, the first end 32 from the first terminus 28 and has a second membrane portion 38 fluidly-isolating, on the second side 22 of the partition plate assembly 12, the second end 34 from the second terminus 30.

In one design of the first expression of the embodiment of FIG. 1, the electric coil 16 is disposed to substantially magnetically influence the second orifice 26.

In one construction of the first expression of the embodiment of FIG. 1, the partition plate assembly 12 has a longitudinal axis 40, and the electric coil 16 is substantially coaxially aligned with the longitudinal axis 40. In the same or a different construction, the second orifice 26 is a substantially annular orifice substantially coaxially aligned with the longitudinal axis 40. In the same or a different construction, the second orifice 26 is disposed radially outward from the electric coil 16.

In one enablement of the first expression of the embodiment of FIG. 1, the first orifice 24 is a substantially annular orifice substantially coaxially aligned with the longitudinal axis 40. In the same or a different enablement, the first orifice 24 is disposed radially outward from the second orifice 26.

In one illustration of the first expression of the embodiment of FIG. 1, the decoupler 14 is disposed in the first orifice 24. The construction, operation, and advantages of hydraulic-mount decouplers are well known and are found, for example, in U.S. Pat. Nos. 5,273,262 and 6,622,995.

In one implementation of the first expression of the embodiment of FIG. 1, the magnetorheological-fluid hydraulic mount 10 also includes a flexible molded assembly 42. The flexible molded assembly 42 has a flexible working leg 44. The flexible working leg 44 is attached to the first side 20 of the partition plate assembly 12. The flexible working leg 44 at least partially surrounds the first membrane portion 36 of the flexible membrane assembly 18 and the first terminus 28 of the first orifice 24. In one construction, the flexible working leg 44 is an elastomer containing an internal metal stiffener (not shown).

In one application of the first expression of the embodiment of FIG. 1, the magnetorheological-fluid hydraulic mount 10 also includes a first mounting member 48 attached to the flexible working leg 44 and attachable to a first component of a vehicle (not shown). In one variation, an annular edge, but not a bottom surface, of the first mounting member 48 is attached to the flexible working leg 44. In a different variation, not shown, a bottom surface (with or without the annular edge) of the first mounting member is covered by, and is attached to, the flexible working leg. Other arrangements of the first mounting member and the flexible working leg are left to the artisan.

In the same or a different application, the magnetorheological-fluid hydraulic mount 10 also includes a second mounting member 50 surrounding the second membrane portion 38, attached to the partition plate assembly 12, and attachable to a second component of a vehicle (not shown). In one variation, the first component of the vehicle is an engine or a transmission. In the same or a different variation, the second component of the vehicle is a vehicle frame. Non-vehicle and other vehicle deployments of the magnetorheological-fluid hydraulic mount 10 are left to the artisan.

A second expression of the embodiment of FIG. 1 is for a magnetorheological-fluid hydraulic mount 10 including a motor-vehicle hydraulic-mount partition plate assembly 12, a hydraulic-mount decoupler 14, an electric coil 16, a flexible membrane assembly 18, and a magnetorheological fluid 52. It is noted that examples of a magnetorheological fluid 52 are known to those skilled in the art. The partition plate assembly 12 has first and second sides 20 and 22, has a non-magnetorheological-fluid first orifice 24 and a magnetorheological-fluid second orifice 26, The first orifice 24 has a first terminus 28 disposed at the first side 20 and a second terminus 30 disposed at the second side 22. The second orifice 26 has a first end 32 disposed at the first side 20 and has a second end 34 disposed at the second side 22. The decoupler 14 is operatively connected to the first orifice 24. The electric coil 16 is disposed to magnetically influence the second orifice 26. The flexible membrane assembly 18 has a first membrane portion 36 surrounding, on the first side 20 of the partition plate assembly 12, the first end 32 and at least partially defining a magnetorheological-fluid pumping chamber 54. The flexible membrane assembly 18 has a second membrane portion 38 surrounding, on the second side 22 of the partition plate assembly 12, the second end 34 and at least partially defining a magnetorheological-fluid reservoir chamber 56. The magnetorheological fluid 52 is disposed in the magnetorheological-fluid pumping and reservoir chambers 54 and 56.

The previously-described designs, constructions, enablements, illustrations, and applications (and variations thereof) of the first expression of the embodiment of FIG. 1 are equally applicable to the second expression of the embodiment of FIG. 1.

In one implementation of the second expression of the embodiment of FIG. 1, the magnetorheological-fluid hydraulic mount 10 also includes a flexible molded assembly 42. The flexible molded assembly 42 has a flexible working leg 44. The flexible working leg 44 is attached to the first side 20 of the partition plate assembly 12. The flexible working leg 44 at least partially surrounds the first membrane portion 36 of the flexible membrane assembly 18 and the first terminus 28 of the first orifice 24 to at least partially define a hydraulic-mount non-magnetorheological-fluid pumping chamber 58. A non-magnetorheological fluid 62 is disposed in the non-magnetorheological pumping chambers 58. An example of a non-magnetorheological fluid 62 is a glycol-based fluid. Other examples are left to the artisan. In one variation, the space between the second membrane portion 38 and the second mounting member 50 is filled with air.

In operation, in one vehicle deployment of the embodiment of FIG. 1, the decoupler 14 undergoes flexing by the non-magnetorheological fluid 62 for the purpose of vibration isolation during small road inputs which results in better high frequency tuning characteristics of the mount 10. In this deployment, the heavier-density magnetorheological fluid 52 essentially is not pumped when the decoupler 14 undergoes such flexing by the lighter-density non-magnetorheological fluid 62. In this deployment, for large road inputs, the decoupler 14 bottoms out (i.e., reaches its fully flexed limit and flexes no further) which causes the magnetorheological fluid 52 to be pumped, wherein the viscosity of the magnetorheological fluid 52 is controlled by the electric coil 16, as can be appreciated by the artisan.

In one design of the embodiment of FIG. 1, the partition plate assembly 12 includes plates 64 and 66 which house the decoupler 14 and provide for the first orifice 24 and includes plates 68, 70 and 72 which support the electric coil 16 and provide for the second orifice 26. Other partition plate assembly designs are left to the artisan.

In one vehicle design of the embodiment of FIG. 1, the decoupler 14 is assembled in the substantially annular first orifice 24 with a designed free space in which it is allowed to flex. For smaller-displacement road inputs, the non-magnetorheological-fluid pumping chamber 58 pushes the non-magnetorheological fluid 62 into the first orifice 24 and the decoupler 14 flexes to allow for the volumetric change of the magnetorheological-fluid pumping chamber 58. In this vehicle design, no non-magnetorheological fluid 62 ever flows past the decoupler 14. For larger-displacement road inputs, the decoupler 14 bottoms out in the free space, and as a result, the magnetorheological fluid 52 is forced to flow through the second orifice 26. The flow of the magnetorheological fluid 52 is controlled by changing the current through the electric coil 16, and, as a result, the damping generated by the mount 10 is changed. As can be appreciated by the artisan, in this design, the effort required to move a lower-density non-magnetorheological fluid 62 is less than the effort needed to move a heavier-density magnetorheological fluid 52. As a result, at high frequencies of road input, the mount 10 generates lower dynamic stiffness which is desirable for vibration isolation. In one variation, the partition plate assembly 12 has a heavier and magnetically-soft-material portion (e.g., plates 68, 70 and 72) proximate the second orifice 26 and the electric coil 16 and has a lighter-material portion (e.g., plates 64 and 66 which, in one example, are aluminum) disposed proximate the first orifice 24. This also results in a weight reduction.

Several benefits and advantages are derived from one or more of the expressions of an embodiment of the invention. Having a decoupler operatively connected to a non-magnetorheological-fluid first orifice in the partition plate assembly allows, in one example, the decoupler to undergo flexing to isolate low displacement vibrations. Since, in this example, the non-magnetorheological fluid has a lower density than the magnetorheological fluid, the decoupler is operated by a lower-density fluid which improves high frequency performance of the mount. High frequency performance is also improved, in this example, by having air on the other side of the decoupler. Having a magnetorheological-fluid second orifice in the partition plate assembly allows the electric coil to control the viscosity of a magnetorheological fluid passing through the second orifice to control the vibration damping of the mount for high displacement vibrations when the decoupler is bottomed out. Applicants' design has, in one example, replaced some of the relatively expensive and heavier magnetorheological fluid with relatively inexpensive and lighter non-magnetorheological fluid resulting in a lower-cost and lower-weight magnetorheological-fluid hydraulic mount.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

The invention claimed is:

1. A magnetorheological-fluid hydraulic mount comprising:
   a) a hydraulic-mount partition plate assembly having a central longitudinal axis, having a first side including a top surface and a second side including a bottom surface, having a non-magnetorheological-fluid first orifice and a magnetorheological-fluid second orifice, wherein the first orifice has a first terminus directly disposed at the top surface and a second terminus directly disposed at the bottom surface, and wherein the second orifice has a first end directly disposed at the top surface and has a second end directly disposed at the bottom surface;
   b) a hydraulic-mount decoupler operatively connected to the first orifice, wherein the decoupler is disposed entirely between the top and bottom surfaces and entirely radially outward from the second orifice;
   c) an electric coil disposed to magnetically influence the second orifice; and
   d) a flexible membrane assembly having a first membrane portion fluidly-isolating, on the top surface of the partition plate assembly, the first end from the first terminus and having a second membrane portion fluidly-isolating, on the bottom surface of the partition plate assembly, the second end from the second terminus.

2. The magnetorheological-fluid hydraulic mount of claim 1, wherein the electric coil is substantially coaxially aligned with the central longitudinal axis.

3. The magnetorheological-fluid hydraulic mount of claim 2, wherein the second orifice is a substantially annular orifice substantially coaxially aligned with the central longitudinal axis.

4. The magnetorheological-fluid hydraulic mount of claim 3, wherein the second orifice is disposed radially outward from the electric coil.

5. A magnetorheological-fluid hydraulic mount comprising:
   a) a hydraulic-mount partition plate assembly having a longitudinal axis, having first and second sides, having a non-magnetorheological-fluid first orifice and a magnetorheological-fluid second orifice, wherein the first orifice has a first terminus disposed at the first side and a second terminus disposed at the second side, and wherein the second orifice has a first end disposed at the first side and has a second end disposed at the second side;
   b) a hydraulic-mount decoupler operatively connected to the first orifice, wherein the decoupler is disposed entirely between the first and second sides and entirely radially outward from the second orifice;
   c) an electric coil disposed to magnetically influence the second orifice; and
   d) a flexible membrane assembly having a first membrane portion fluidly-isolating, on the first side of the partition plate assembly, the first end from the first terminus and having a second membrane portion fluidly-isolating, on the second side of the partition plate assembly, the second end from the second terminus,
   wherein the electric coil is substantially coaxially aligned with the longitudinal axis,
wherein the second orifice is a substantially annular orifice substantially coaxially aligned with the longitudinal axis, wherein the second orifice is disposed radially outward from the electric coil, and wherein the first orifice is a substantially annular orifice substantially coaxially aligned with the longitudinal axis.

6. The magnetorheological-fluid hydraulic mount of claim 5, wherein the first orifice is disposed radially outward from the second orifice.

7. The magnetorheological-fluid hydraulic mount of claim 6, wherein the first terminus of the first orifice faces in a direction substantially parallel to the longitudinal axis and the second terminus of the first orifice faces in a direction substantially parallel to the longitudinal axis.

8. The magnetorheological-fluid hydraulic mount of claim 7, also including a flexible molded assembly having a flexible working leg attached to the first side of the partition plate assembly and at least partially surrounding the first membrane portion of the flexible membrane assembly and the first terminus of the first orifice.

9. The magnetorheological-fluid hydraulic mount of claim 8, also including a first mounting member attached to the flexible working leg and attachable to a first component of a vehicle.

10. The magnetorheological-fluid hydraulic mount of claim 9, also including a second mounting member surrounding the second membrane portion, attached to the partition plate assembly, and attachable to a second component of a vehicle.

11. A magnetorheological-fluid hydraulic mount comprising:
   a) a motor-vehicle hydraulic-mount partition plate assembly having a central longitudinal axis, having a first side including a top surface and a second side including a bottom surface, having a non-magnetorheological-fluid first orifice and a magnetorheological-fluid second orifice, wherein the first orifice has a first terminus directly disposed at the top surface and a second terminus directly disposed at the bottom surface, and wherein the second orifice has a first end directly disposed at the top surface and has a second end directly disposed at the bottom surface;
   b) a hydraulic-mount decoupler operatively connected to the first orifice, wherein the decoupler is disposed entirely between the top and bottom surfaces and entirely radially outward from the second orifice;
   c) an electric coil disposed to magnetically influence the second orifice;
   d) a flexible membrane assembly having a first membrane portion surrounding, on the top surface of the partition plate assembly, the first end and at least partially defining a hydraulic-mount magnetorheological-fluid pumping chamber and having a second membrane portion surrounding, on the bottom surface of the partition plate assembly, the second end and at least partially defining a hydraulic-mount magnetorheological-fluid reservoir chamber; and
   e) a magnetorheological fluid disposed in the magnetorheological-fluid pumping and reservoir chambers.

12. The magnetorheological-fluid hydraulic mount of claim 11, wherein the electric coil is substantially coaxially aligned with the central longitudinal axis.

13. The magnetorheological-fluid hydraulic mount of claim 12, wherein the second orifice is a substantially annular orifice substantially coaxially aligned with the central longitudinal axis.

14. The magnetorheological-fluid hydraulic mount of claim 13, wherein the second orifice is disposed radially outward from the electric coil.

15. A magnetorheological-fluid hydraulic mount comprising:
   a) a motor-vehicle hydraulic-mount partition plate assembly having a longitudinal axis, having first and second sides, having a non-magnetorheological-fluid first orifice and a magnetorheological-fluid second orifice, wherein the first orifice has a first terminus disposed at the first side and a second terminus disposed at the second side, and wherein the second orifice has a first end disposed at the first side and has a second end disposed at the second side;
   b) a hydraulic-mount decoupler operatively connected to the first orifice, wherein the decoupler is disposed entirely between the first and second sides and entirely radially outward from the second orifice;
   c) an electric coil disposed to magnetically influence the second orifice;
   d) a flexible membrane assembly having a first membrane portion surrounding, on the first side of the partition plate assembly, the first end and at least partially defining a hydraulic-mount magnetorheological-fluid pumping chamber and having a second membrane portion surrounding, on the second side of the partition plate assembly, the second end and at least partially defining a hydraulic-mount magnetorheological-fluid reservoir chamber; and
   e) a magnetorheological fluid disposed in the magnetorheological-fluid pumping and reservoir chambers,
   wherein the electric coil is substantially coaxially aligned with the longitudinal axis,
wherein the second orifice is a substantially annular orifice substantially coaxially aligned with the longitudinal axis, wherein the second orifice is disposed radially outward from the electric coil, and wherein the first orifice is a substantially annular orifice substantially coaxially aligned with the longitudinal axis.

16. The magnetorheological-fluid hydraulic mount of claim 15, wherein the first orifice is disposed radially outward from the second orifice.

17. The magnetorheological-fluid hydraulic mount of claim 16, wherein the second terminus of the first orifice is in contact with air.

18. The magnetorheological-fluid hydraulic mount of claim 17, also including a flexible molded assembly having a flexible working leg attached to the first side of the partition plate assembly and at least partially surrounding the first membrane portion of the flexible membrane assembly and the first terminus of the first orifice to at least partially define a hydraulic-mount non-magnetorheological-fluid pumping chamber, and further including a non-magnetorheological fluid disposed in the non-magnetorheological pumping chamber.

19. The magnetorheological-fluid hydraulic mount of claim 18, also including a first mounting member attached to the flexible working leg and attachable to a first motor-vehicle component.

20. The magnetorheological-fluid hydraulic mount of claim 19, also including a second mounting member surrounding the second membrane portion, attached to the partition plate assembly, and attachable to a second motor-vehicle component.

* * * * *